2,830,030

SOLUTION OF TEREPHTHALATE POLYESTER

Otto Fuchs, Frankfurt am Main, Germany, assignor to Farbwerke Hoechst Aktiengesellschaft vormals Meister Lucius & Bruning, Frankfurt am Main, Germany, a corporation of Germany No Drawing. Application March 9, 1954
Serial No. 415,147

Claims priority, application Germany March 13, 1953

3 Claims. (Cl. 260—32.4)

The present invention relates to compositions of matter.

Shaped structures, such as threads, foils and the like, composed of polyesters of terephthalic acid with aliphatic dihydroxy-compounds, for example, high molecular, linear polyethylene glycol terephthalate, are usually formed from a fused mass of the polyester. Shaped structures could also be made from solutions of the polyester, but owing to a lack of suitable solvents this method is of no practical importance. It is true that phenols and nitrobenzene at a raised temperature are known to be good solvents for such polyesters, but they are not very suitable on account of their disadvantageous physiological properties.

I have found that compounds of the general formula R—X—OH or R—X—NH$_2$, in which R represents an aromatic or partially hydrogenated aromatic radical and X represents an aliphatic hydrocarbon radical with 1–4 carbon atoms whose chain can be branched, or mixtures of such compounds, are well suited as solvents for polyesters of terephthalic acid with aliphatic dihydroxy-compounds. They may be used either by themselves or in conjunction with other softeners and/or diluents. In these compounds, R is derived mainly from benzenes, cyclohexadiene, naphthalene, tetrahydronaphthalene and diphenyl and X represents the groups —CH$_2$—, —CH$_2$CH$_2$—, —CH$_2$CH$_2$CH$_2$—, which may also contain CH$_3$ groups, for example, such as —CHCH$_3$CH$_2$—.

The compounds used as solvents may also contain more than one, for example, about 2–3 of the aforesaid groups which may be identical or different from one another.

Moreover, they may contain further substituents, especially hydroxy groups, lower alkyl groups such as methyl, ethyl, propyl or butyl groups, or lower alkoxy groups such methoxy, ethoxy, propoxy or butoxy groups or nitro groups and/or halogen atoms such as fluorine, chlorine, bromine or iodine, or keto or aldehyde groups.

Some of the above mentioned compounds serving as solvents melt above 100° C., so that when solutions in these solvents are used there is a risk that the solvent may crystallize out. However, the melting point can be lowered by using a mixture of two or more compounds of the kind mentioned above and in this manner even the solubility is sometimes improved.

The concentration of the polyester in the solvent or in a mixture of the solvent and a diluent may vary depending on the molecular weight of the polyester.

Furthermore, these compounds may also be diluted with other substances which by themselves do not dissolve the polyester or dissolve it only with difficulty. As such diluents there may be used more especially aromatic or partially hydrogenated aromatic compounds. As diluents there may be mentioned compounds such as naphthalene, diphenyl, tetrahydronaphthalene, decahydronaphthalene, xylene, methyl-naphthalene or mesitylene. The proportion of the diluent in the solvent-diluent mixture may be up to 50%.

The solutions so obtained are especially suitable for the manufacture of foils. The foils are made in known manner, for example, by the use of a foil casting machine.

The following example serves to illustrate the invention, but is not intended to limit it thereto:

Solubility tests were carried out by dissolving 1 gram of polyethylene glycol terephthalate in 100 cc. of the solvent or mixture of solvents, and then determining the temperature at which the polyester separated out on cooling. This temperature is referred to as "solubility temperature" and can serve only as a numerical value for comparing the different solvent powers of the various solvents or mixtures of solvents. In order to prepare the solutions rapidly it is of advantage to use the solvent at a temperature which, depending on the concentration of the polyester, is about 20 to about 40 degrees centigrade above the solubility temperature, and which should be at least 120° C. The specific viscosity of the polyester used was 0.64 for a solution of 1% strength in phenol at 50° C. The results are given in the following table, in which the proportions of the solvents in solvent mixtures are by weight:

| Solvent: | Solubility temperature (°C.) |
|---|---|
| Benzyl alcohol | 105 |
| 2-phenyl-ethanol-1 | 115 |
| 1-phenyl ethanol-1 | 105 |
| 3-phenyl propanol-1 | 150 |
| 4-chlorobenzyl alcohol | [1] 70 |
| 4-methylbenzyl alcohol | [1] 130 |
| 3-nitrobenzyl alcohol | [1] 30 |
| Benzylamine | 120 |
| 2-phenylethylamine-1 | 80 |
| Benzyl alcohol+chlorobenzene, 1:1 | 90 |
| Benzyl alcohol+benzoic acid, 1:1 | 115 |
| Benzyl alcohol+benzamide, 1:1 | 130 |
| Benzyl alcohol+benzaldehyde, 1:1 | 85 |

[1] Below this temperature the solvent crystallizes out from the solution.

When the concentration of the polyester is increased, the solubility temperature also increases. If, for example, benzyl alcohol is used as solvent, the solubility temperature is 105° C. for a solution of 1% strength, 115° C. for a solution of 5% strength, 125° C. for a solution of 20% strength and 145° C. for a solution of 30% strength.

If desired, solutions of the polyester in the above solvents can be prepared which contain a maximum of about 40% of the polyester.

I claim:

1. A solution comprising an aliphatic glycol polyester of terephthalic acid dissolved in benzyl alcohol substituted in the nucleus by a radical selected from the group consisting of —NO$_2$ and —Cl.

2. A solution comprising the ethylene glycol polyester of terephthalic acid dissolved in 4-chloro-benzyl alcohol.

3. A solution comprising the ethylene glycol polyester of terephthalic acid dissolved in 3-nitro-benzyl alcohol.

References Cited in the file of this patent

FOREIGN PATENTS 609,947    Great Britain _____ Oct. 8, 1948